UNITED STATES PATENT OFFICE.

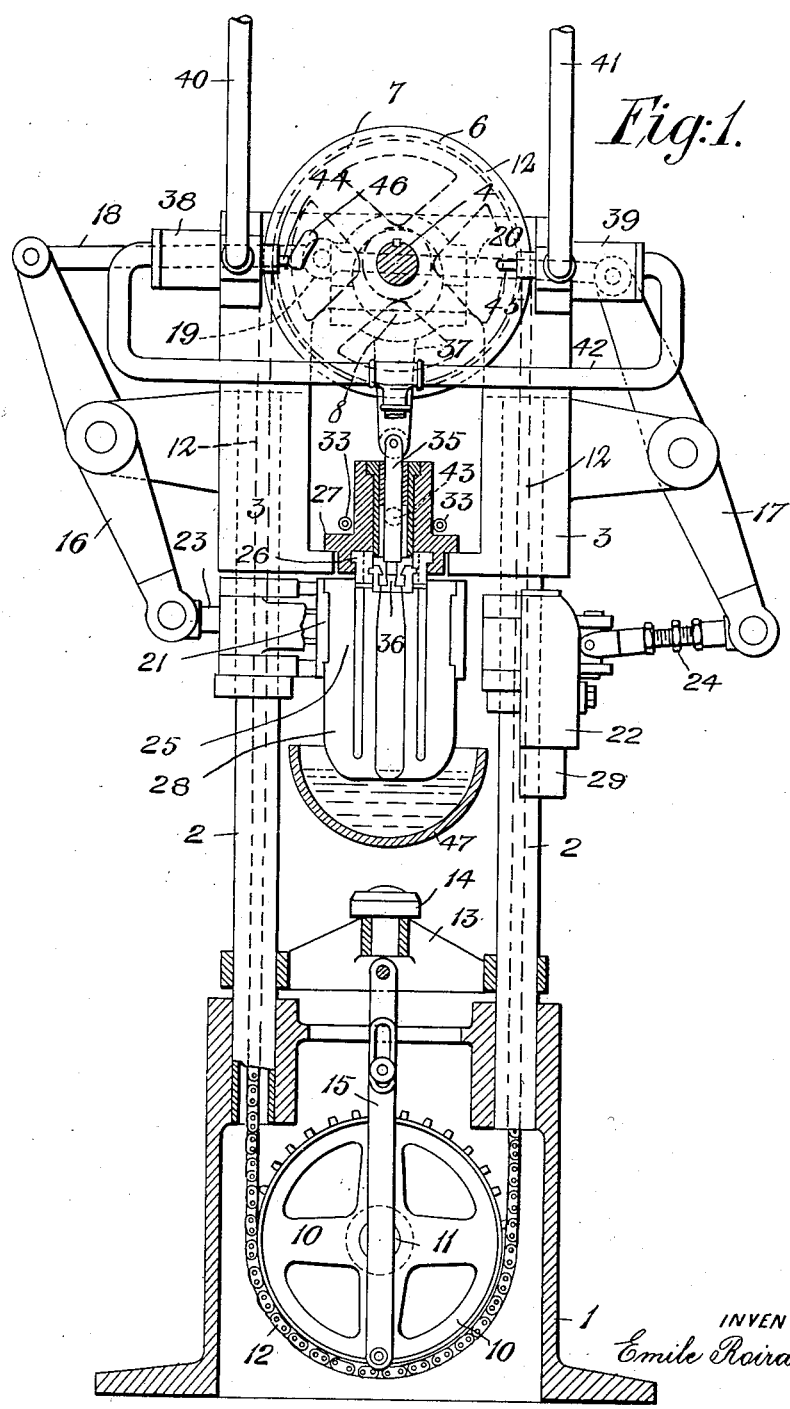

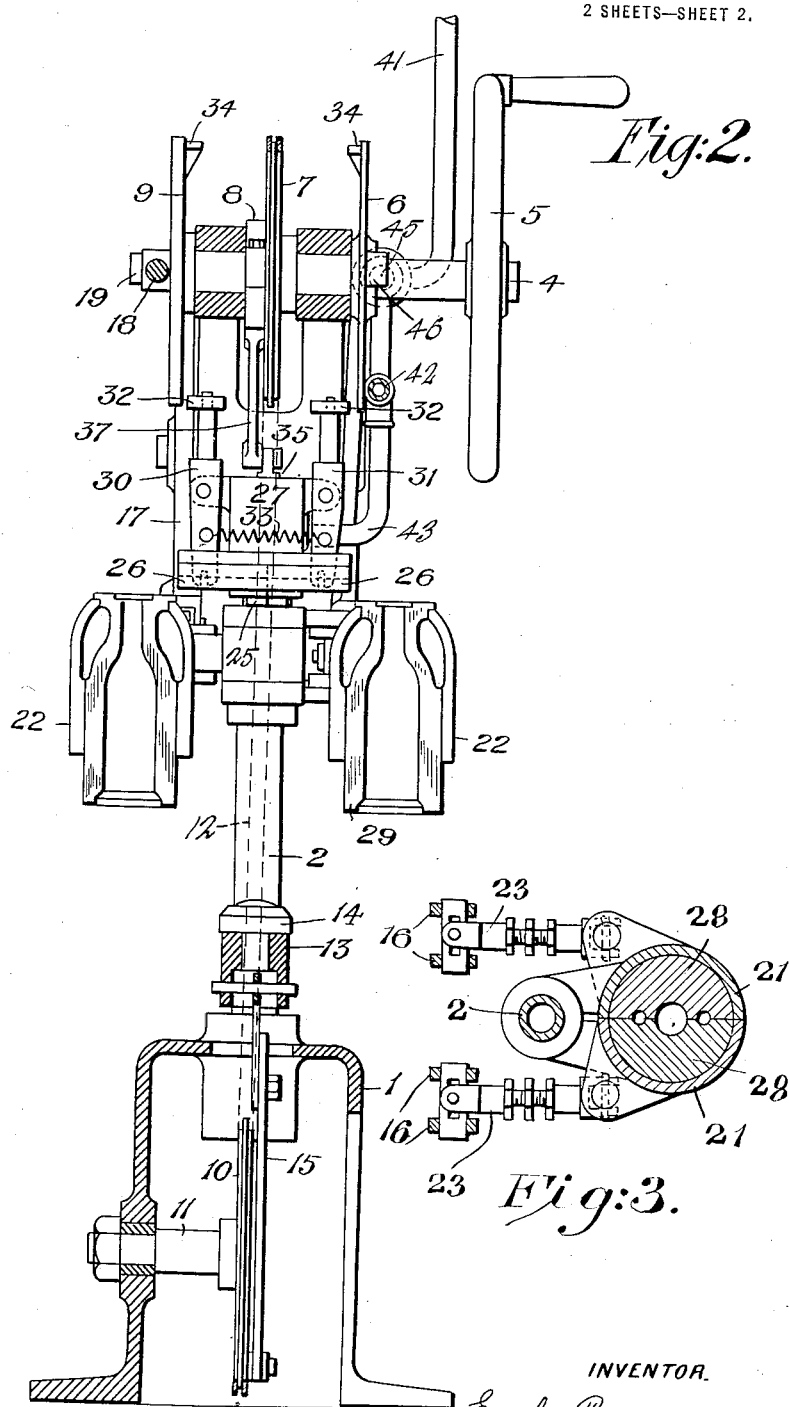

EMILE ROIRANT, OF ST.-OUEN, FRANCE, ASSIGNOR TO ARTHUR WILZIN, OF ST.-OUEN, FRANCE.

GLASS SHAPING AND BLOWING MACHINE.

1,337,723.      Specification of Letters Patent.      Patented Apr. 20, 1920.

Application filed October 9, 1917. Serial No. 195,547.

*To all whom it may concern:*

Be it known that I, EMILE ROIRANT, a citizen of the Republic of France, and resident of St.-Ouen, Seine, France, have invented new and useful Improvements in Glass Shaping and Blowing Machines, of which the following is a specification.

This invention has relation to glass shaping and blowing machines.

In glass shaping and blowing machines as heretofore proposed, the design of the machines has always been such that it has been necessary to impart displacements or translatory movements to one or more of the molds at one time or another in the operation of the machines. These displacements or translatory movements, which were in addition to the opening and closing movements proper of the parison, neck and finishing molds, necessitated the provision of mechanism which increased the complexity of the machines and added considerably to their cost and size.

The present invention has for objects, *inter alia*, to improve and simplify the construction and operation of glass shaping and blowing machines, and to provide machines which shall possess certain practical advantages and enable economies in their manufacture and operation to be introduced.

For these and other purposes, and in accordance with this invention, the parison, neck and finishing molds have opening and closing movements only. Further the opening movement of one mold commences at the same time as the closing movement of the other mold.

In order that the invention may be clearly understood, a construction of machine embodying, and in accordance with, this invention will now be described with reference to, and by the aid of, the accompanying drawings, which are not, however, to be regarded as more than diagrammatic, constructional and other details having been omitted for clearness of illustration.

Figure 1 is a front elevation, parts being in section, and

Fig. 2 is a side elevation, with parts also in section.

Fig. 3 is a sectional view of the molds, etc., taken through their points of support.

1 is the hollow base member of the machine on which are mounted two vertical and hollow columns 2. These columns 2 carry, and are connected together by, at their upper ends, a casting 3, in the upper part of which is journaled a shaft 4 on which a flywheel 5, a circular disk 6, a sprocket wheel 7, an eccentric 8 and a second circular disk 9 are mounted and arranged in the order mentioned.

10 is a second sprocket wheel: this sprocket wheel, which is mounted upon a stud or spindle 11 and is contained within the hollow base member 1, is geared by a chain 12, which passes through the columns 2, to the sprocket wheel 7. 13 is the bottom mold carrier and 14 is the bottom mold mounted thereon. The carrier 13 is mounted on the columns 2 so as to be capable of an up and down movement in relation thereto and to be guided in such movements thereby. The up and down movements are imparted to the carrier 13 by the sprocket wheel 10 to which it is connected by a connecting rod 15. The connection of the connecting rod 15 with the carrier 13 is adjustable; this permits an adjustment of the carrier 13 to enable the bottom mold 14 to coöperate with blowing or finishing molds of different lengths.

16, 17 are two levers mounted on opposite sides of the casting 3. The upper end of the lever 16 is connected by a rod 18 to an eccentrically disposed pin 19 on the disk 9, to which pin the upper end of the lever 17 is also connected by a rod 20, the levers 16 and 17 both being bifurcated at their lower ends, and these bifurcations being attached respectively to the halves of the molds. 21 are the halves of the parison mold carrier and 22 are the halves of the finishing mold carrier. The halves of the carrier 21 are hinged on one of the columns 2 (the left hand column, Fig. 1) and are coupled by a member 23, that is adjustable as to length, to the lower end of the lever 16. The halves of the carrier 22 are similarly mounted on the other of the columns 2, but are coupled by a member 24, also adjustable as to length, to the lower end of the lever 17. The carriers 21, 22 are hinged to the columns 2 in the same plane. The construction, arrangement and operation of parts are such that when one carrier is open, the other is closed.

25 is the neck mold of bipartite construction. Each part of the neck mold is carried by a slide 26, the two slides 26 being mounted in a neck mold carrier 27 so as to be movable in relation thereto. The neck mold carrier 27 is loosely seated on the lower part of the casting 3, which is formed with a hole into which a part of the carrier 27 extends. The construction and arrangement of the carrier 27 are such that when the neck mold 25 is embraced by the parison mold 28 or the finishing mold 29, it (the carrier 27) can move freely and easily and permit the neck mold 25 to assume a position central of the embracing mold. 30, 31 are two cam levers mounted upon opposite sides of the neck mold carrier 27, and each carrying, at its upper end, a roller 32 and connected at its lower end to one of the slides 26. 33 are springs connected at their ends to the cam levers 30, 31 and so disposed that they tend to hold the slides 26, and therefore the parts of the neck mold 25, in contact with one another. 34, 34 are cams mounted on the disks 6, 9; in the rotation of the disks 6, 9, as hereinafter explained, the cams 34 come in contact with the rollers 32 and cause the cam levers 30, 31 to turn about their pivots against the action of the springs 33 and move the slides 26, and therefore the parts of the neck mold 25, apart.

In addition to carrying the slides 26 and neck mold 25, the carrier 27 serves also as a container and guide for a plunger 35 on the lower end of which is mounted the former 36 for the mouth of the bottle. The plunger 35 is operated from the eccentric 8, being connected therewith by a sheave and connecting rod 37.

38, 39 are two valve chests mounted on opposite sides of the casting 3. The one, 38, is connected by a pipe 40 with a source of negative pressure and the other, 39, is connected by a pipe 41 with a source of air under pressure. The valve chests 38, 39 are also each in connection with a pipe 42 that is, in turn, in connection with the interior of the neck mold carrier 27 through a pipe 43. The valves within the valve chests are normally closed and their stems 44, 45 are arranged to be acted on sequentially by a cam 46 on the disk 6. The valve stems 44, 45 are in the same horizontal plane and each is actuated once during a complete rotation of the disk 6 and after a movement of the disk through 180 deg.

47 is a recipient filled with glass.

The operation of the machine is as follows:—

The parts are in the positions shown, that is to say, the parison mold 28 is closed (only one half of the parison mold is shown in Fig. 1) and embraces the neck mold 25; the plunger 35 and former 36 are at the lowest point in their travel; the cam 46 is pressing against the valve stem 44 so that the valve controlled thereby is open and the interiors of the neck mold carrier 27, the neck mold 25, and the parison mold 28 are in connection with the source of negative pressure, and the recipient 47 is in such a position between the columns 2 that the lower end of the parison mold 28 dips into the glass contained therein. Under the action of the suction, the glass is caused to rise and fill the parison mold 28 and neck mold 25. When the molds 28, 25 are full the recipient 47 is lowered and moved away clear of the columns 2, the string of glass depending from the parison mold 28 being cut off by a blade, not shown, which slides against the lower surface of the mold. The flywheel 5 is now rotated through 180 deg. This rotation imparts movement to the parts of the machine as follows:—The bottom mold 14 is raised and comes in contact with the lower end of the parison; the parison mold 28 is opened and the parison released therefrom, the parts of the finishing mold 29 simultaneously closing around the parison, which, during the time that it is out of contact with the molds 28, 29 is suspended from the neck mold 25, and the mandrel 35 with former 36 are raised so that the blowing inlet in the upper end of the parison is left clear. At the completion of the rotation of the flywheel 5, through 180 deg., the cam 46 comes into contact with the valve stem 45, thereby opening the valve controlled thereby and allowing air under pressure to pass into the neck mold carrier 27 and blow the parison to the shape of the finishing mold 29. When the bottle has been blown, the flywheel 5 is again moved through 180 deg. This rotation imparts movement to the parts of the machine as follows:—The finishing mold 29 is opened and the bottle released therefrom and also from the neck mold 25, the parts of which are moved apart by the action of the cams 34 on the cam levers 30, 31; the bottom mold 14 descends with the bottle resting thereon; the plunger 35 with former 36 descends to its lowest position; the parts of the neck mold 25 automatically come together as soon as the cams 34 cease to act on the cam levers 30, 31 and the parison mold 28 is closed ready for a new charge of glass.

The machine is shown as hand operated, but it will be understood that the machine shown and described is one example only of carrying out the invention and that it could be operated mechanically or automatically and designed and constructed otherwise without departure from the spirit and scope of the invention.

What I claim is:—

1. In a machine for the manufacture of hollow glass articles, the combination of a two-part hinged parison mold, means for conveying liquid glass to the bottom of said mold, means for simultaneously exhausting the air from said mold, a two-part finishing mold, means for opening said parison mold and simultaneously closing said finishing mold about a common fixed axis, and stationary supports on which said molds are hinged.

2. In a machine for the manufacture of hollow glass articles, the combination of a two-part hinged parison mold, means for conveying liquid glass to the bottom of said mold, means for simultaneously exhausting the air from said mold, a two-part finishing mold, means for opening said parison mold and simultaneously closing said finishing mold about a common fixed axis, stationary supports on which said molds are hinged, an eccentric, and a pair of levers operatively connected at one of their ends to each of said molds and at their opposite ends to said eccentric.

3. In a machine for the manufacture of hollow glass articles, the combination with a two-part hinged parison mold adapted to be filled from below, of a two-part hinged finishing mold for finish blowing of the article, each of said molds having its halves hinged together in a fixed axis, said axes being so positioned with respect to each other that the molds may be consecutively closed about a common axis, means for consecutively opening and closing said molds, comprising a pair of levers pivoted to frame members of the machine, one lever being connected to the parison mold parts and the other lever being connected to the finishing mold parts, and means for simultaneously operating said levers, comprising a common crank pin connected to said levers.

4. In a machine for the manufacture of hollow glass articles, the combination with a two-part hinged parison mold adapted to be filled from below, of a two-part hinged finishing mold for finish blowing of the article, each of said molds having its halves hinged together in a fixed axis, said axes being so positioned with respect to each other that the molds may be consecutively closed about a common axis, a neck mold coöperating with said parison and finishing molds and formed in two parts, the said parts being slidably mounted on a floating neck mold carrier, yieldable means for normally holding said parts in contact, means for separating the parts of the neck mold, and means for consecutively causing said parison and finishing molds to function.

5. In a machine for the manufacture of hollow glass articles, the combination with a two-part hinged parison mold adapted to be filled from below, of a two-part hinged finishing mold for finish blowing of the article, each of said molds having its halves hinged together in a fixed axis, said axes being so positioned with respect to each other that the molds may be consecutively closed about a common axis, a neck mold coöperating with said parison and finishing molds and formed in two parts, the said parts being slidably mounted on a floating neck mold carrier, resilient means for normally maintaining the two parts of the neck mold together, a pair of cam actuated levers each operatively connected to one part of said neck mold for controlling the opening and closing of said mold, and means for consecutively causing said parison and finishing molds to function.

6. In a machine for the manufacture of hollow glass articles, the combination with a two-part hinged parison mold adapted to be filled from below, of a two-part hinged finishing mold for finish blowing of the article, each of said molds having its halves hinged together in a fixed axis, said axes being so positioned with respect to each other that the molds may be consecutively closed about a common axis, a neck mold coöperating with said parison and finishing molds and formed in two parts, the said parts being slidably mounted on a floating neck mold carrier having a hole extending longitudinally therethrough, a mouth forming plunger slidably mounted therein, and means for causing said parison and finishing molds to function.

7. In a machine for the manufacture of hollow glass articles, the combination of a stationary frame comprising a head portion and a base portion and supports connecting the two, of a two-part hinged parison mold and a two-part hinged finishing mold, each of said molds having its halves hinged together in a fixed axis on said supports to consecutively close about a common center between said supports.

8. In a machine for the manufacture of hollow glass articles, the combination of a stationary frame comprising a head portion and a base portion and supports connecting the two, of a two-part hinged parison mold and a two-part hinged finishing mold, each of said molds having its halves hinged together in a fixed axis on said supports to consecutively close about a common center between said supports, and means carried by said head and base members operative consecutively with said molds for effecting filling and blowing of the hollow glass article.

Dated this 19th day of September, 1917.

EMILE ROIRANT.